Dec. 22, 1964   J. E. KNOBLOCK   3,162,185
VALVE STEM OIL SEAL
Filed June 8, 1962   2 Sheets-Sheet 1

JOHN E. KNOBLOCK
INVENTOR

BY John R. Faulkner
Ernest A. Beutler
ATTORNEYS

Dec. 22, 1964    J. E. KNOBLOCK    3,162,185
VALVE STEM OIL SEAL
Filed June 8, 1962    2 Sheets-Sheet 2

JOHN E. KNOBLOCK
INVENTOR

BY *John R. Faulkner*
*Ernest A. Beutler*
ATTORNEYS

United States Patent Office 3,162,185
Patented Dec. 22, 1964

3,162,185
VALVE STEM OIL SEAL
John E. Knoblock, Detroit, Mich., assignor to Ford Motor Company, Dearborn, Mich., a corporation of Delaware
Filed June 8, 1962, Ser. No. 201,066
1 Claim. (Cl. 123—188)

This invention relates to internal combustion engines and, more particularly, to oil seals for the valves of internal combustion engines.

The valve train of modern high-speed internal combustion engines has been a subject of considerable refinement and sophistication. Further improvement is still required in this field, however. The valve train is still a source of noise, oil consumption and maintenance requirements.

In an internal combustion engine a stem portion of the valve is reciprocally supported within a valve guide in either the cylinder head in an overhead valve engine or in the cylinder block in an L-head engine. It is most desirable to maintain a uniform film of lubricating oil between the valve stem and valve guide to reduce wear and promote free operation. If the valve guide becomes worn, the axis of the valve may become skew to the axis of the guide and cause the valve to bind within the guide. The valve stem axis may also become eccentric to the axis of the valve seat and cause a noise known as "seating noise."

The lubrication of the valve stem also gives rise to other difficulties. Unless an effective seal is maintained at the end of the valve guide, oil leakage may occur into the cylinder resulting in excessive smoking and high oil consumption. Additionally, when the valve is open the oil upon the valve stem is subjected to extremely high temperatures, particularly where the exhaust valve is concerned. The high temperature can cause carbonizing of the oil upon the exposed portion of the valve stem. The incrustation of the oil on the valve stem causes the valve to bind in the guide and results in excessive wear. The aforementioned problems are particularly acute in an overhead valve engine wherein the force of gravity causes the oil to flow from the valve guide down the valve stem toward the valve head.

It is, therefore, the principal object of this invention to provide an improved valve stem oil seal.

It is a further object of this invention to provide an improved valve stem oil seal that wipes the oil from the valve stem during opening of the valve.

It is a still further object of the invention to provide a valve stem oil seal that centralizes the valve stem in the valve guide.

An internal combustion engine embodying this invention has a gas flow that opens into a cylinder of the engine. A valve having an enlarged diameter head part and a reduced diameter stem part is reciprocably supported within a valve guide in the engine to alternately open and close the gas flow port. The novel oil seal has means engaging the valve stem part around its circumference and resiliently urges the valve stem part in a radially centralized position in the valve guide.

Further objects and advantages of this invention will become more apparent as this description proceeds, particularly when considered in conjunction with the accompanying drawings, wherein.

Figure 1:
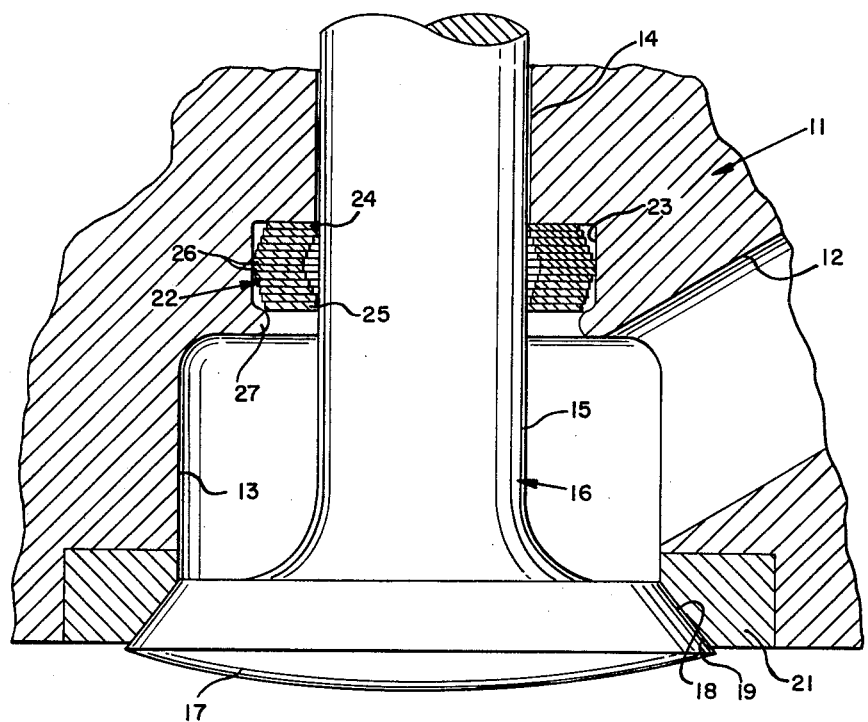
FIGURE 1 is a cross sectional view taken through a portion of the valve gear of an internal combustion engine showing one embodiment of this invention.
Figure 2:
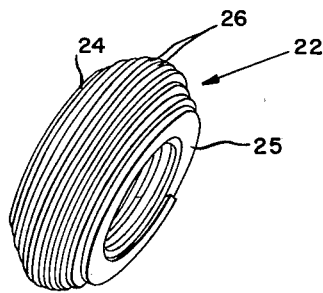
FIGURE 2 is a perspective view showing the valve stem oil seal of the embodiment of FIGURE 1.

Referring now in detail to the drawings and in particular to the embodiment of FIGURES 1 and 2, there is indicated generally at 11 the cylinder head of an internal combustion engine. Formed integrally within the cylinder head 11 is a gas flow port 12 having an enlarged opening 13 that is adapted to discharge downwardly into a cylinder of the engeine above which the cylinder head 11 is positioned. A bore 14 is vertically disposed in the cylinder head 11 concentric with the enlarged opening 13 to provide a guide for a stem 15 of a poppet valve indicated generally at 16. An enlarged diameter head portion 17 of the valve 16 has a beveled seating surface 18 that is adapted to seat against beveled surface 19 of a hardened valve seat 21, inserted into the cylinder head 11.

A valve stem oil seal indicated generally at 22 and shown in perspective in FIGURE 2 is inserted into a bore 23 formed in the cylinder head 11 intermediate the enlarged opening 13 and bore 14. The oil seal 22 comprises a coiled spring formed of a flat wire wound into a barrel shape. As best seen in FIGURE 1 the oil seal 22 has at least one convolution 24 formed at its upper end and at least one convolution 25 formed at its lower end that engage the valve stem 15 completely around its circumference. Intermediate the convolutions 24 and 25 one or more convolutions 26 engage the bore 23 around its circumference.

A lip 27 formed at the lower end of the bore 23 engages the lower convolutions 25 to maintain the oil seal 22 in position. The oil seal 22 is resilient in a radial direction and is compressed upon insertion into the bore 23 over the lip portion 27. When inserted as shown in FIGURE 1, the oil seal 22 exerts a radial force upon the valve stem 15 to position the valve 16 centrally within the valve guide or bore 14.

Because of the intimate contact of the convolutions 24 and 25 with the valve stem 15 and the convolutions 26 with the bore 23, a film of oil is maintained within the valve guide 14 to lubricate the valve stem 15 and prevent wear of the valve guide 14. When the valve 16 moves into its open position, the convolutions 24 and 25 will wipe oil from the valve stem 15 to preclude the presence of oil upon the exposed portion of the valve stem 15. The presence of a continuous and uniform film of oil in the valve guide 14 has a tendency to take up clearance present because of wear of the valve guide and provides additional centralizing action for the valve stem 15 within the valve guide 14. It should also be noted that adjacent flat convolutions of the oil seal 22 are in close abutting relation. This provides further insurance against leakage of the film of oil contained between the valve guide 14 and the valve stem 15.

Figure 3:
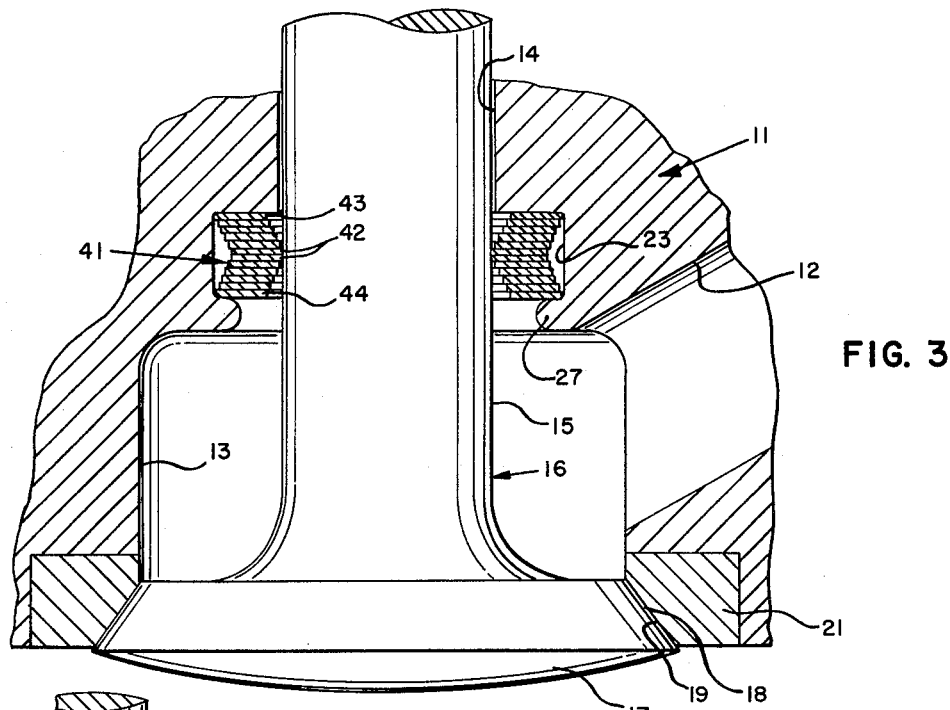
FIGURE 3 is a cross sectional view, in part similar to FIGURE 1, showing another embodiment of this invention.
Figure 4:
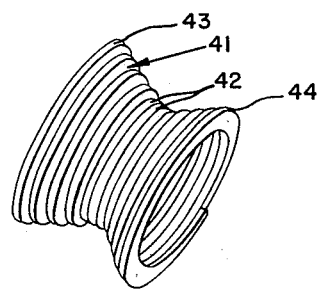
FIGURE 4 is a perspective view showing the valve stem oil seal of the embodiment of FIGURE 3.

In describing the other embodiments of this invention, common elements have been identified by reference numerals identical to those used in describing the embodiment of FIGURES 1 and 2. Referring now to the embodiment of FIGURES 3 and 4, the oil seal is identified generally by the reference numeral 41 and is shown in perspective view in FIGURE 4. The oil seal 41 comprises a coiled spring formed from a flat wire wound into an hourglass shape. The oil seal 41 is contained within the bore 23 in the cylinder head 11 and is axially positioned therein by the lip portion 27.

One or more intermediate convolutions 42 of the oil seal 41 contact the valve stem 15 around its circumference. The end convolutions 43 and 44 of the oil seal 41 contact the diameter of the bore 23 around its circumference and resiliently urge the valve stem 15 to a centralized position in the valve guide 14.

As in the embodiment of FIGURES 1 and 2 adjacent convolutions of the oil seal 41 are in abutting relationship to assist in the oil sealing qualities.

Figure 5:
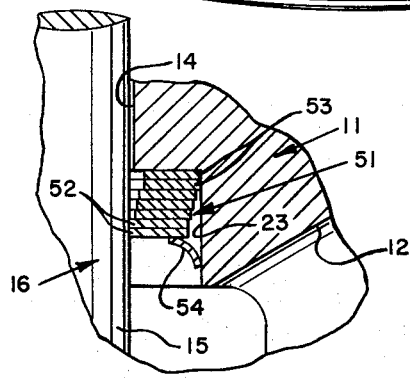
FIGURE 5 is a cross sectional view, in part similar to FIGURE 1, showing another embodiment of the invention.

In the embodiment shown in FIGURE 5 the oil seal, indicated generally at 51, is a conically shaped coiled spring element formed from a flat wire. One or more convolutions 52 of one end of the coil engage the valve stem 15 around its circumference and one or more convolutions 53 of the other end engage the bore 23 to resiliently urge the valve stem 15 into a centralized position in the valve guide 14. In this embodiment the oil seal 51 is maintained within the bore 23 by a snap ring 54 dispensing with the necessity of an integral lip.

Figure 6:
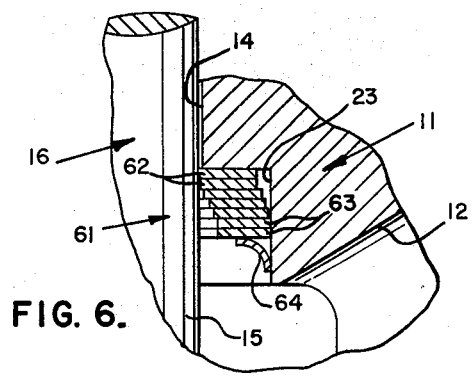
FIGURE 6 is a view similar to FIGURE 5 showing a still further embodiment of the invention.

In the embodiment shown in FIGURE 6, oil seal 61 comprises a conically formed coiled spring formed from the flat wire. One or more of the upper convolutions 52 engage the valve stem 15 around its circumference and one or more of the lower end convolutions 63 engage the bore 23 to yieldably urge the valve stem 15 in a centralized position in the valve guide 14. A snap ring 64 maintains the oil seal 61 within the bore 23.

It is to be understood that, although the embodiments of the oil seal described have been illustrated in the environment of an overhead valve engine, the invention is not so limited. The invention may be practiced with equal facility in other types of machines having other valve mounting arrangements. The advantages of the invention are, however, more readily apparent when practiced with an overhead valve engine having vertically disposed valves. It is also to be understood that the invention may be practiced with either the inlet or exhaust valve or both although the advantages will be more apparent when practiced with the exhaust valve due to the high temperatures involved.

Other modifications may be made from the embodiments shown and described without departing from the spirit and scope of the invention, as defined by the appended claims.

I claim:

A poppet valve assembly including a supporting body having a gas flow port opening through a lower side thereof, said supporting body defining a valve guide positioned at least in part above said gas flow port, a valve having a reduced diameter stem portion reciprocally received in said valve guide, said valve further having an enlarged diameter head portion positioned below said stem portion and adapted to alternately open and close the opening of said gas flow port, said body having an enlarged diameter opening adjacent the lower end of said valve guide adjacent said gas flow port, and an oil seal for permitting oil to accumulate between said valve guide and the adjacent portion of said valve stem without entering into said gas flow port, said oil seal comprising coiled spring means having abutting adjacent convolutions interposed between said enlarged diameter opening and the adjacent valve stem portion, said coiled spring means having at least one convolution engaging said valve stem portion around its circumference and at least one convolution engaging said enlarged diameter opening, said coiled spring means further being operative to urge said valve stem portion in a radially centralized location in said valve guide.

References Cited in the file of this patent

UNITED STATES PATENTS

| 206,695 | Vivarttas | Aug. 6, 1878 |
| 1,569,455 | Burwell | Jan. 12, 1926 |
| 1,952,339 | Solenberger | Mar. 27, 1934 |
| 2,157,867 | Robertson | May 9, 1939 |
| 2,418,674 | Steiner | Apr. 8, 1947 |
| 2,423,181 | Emery | July 1, 1947 |
| 2,761,438 | Niess | Sept. 4, 1956 |

FOREIGN PATENTS

| 948,622 | France | Jan. 31, 1949 |
| 866,665 | Great Britain | Apr. 26, 1961 |